(12) United States Patent
Capone et al.

(10) Patent No.: US 11,449,945 B1
(45) Date of Patent: *Sep. 20, 2022

(54) ITEM INVENTORY AND ITEM REPLACEMENT

(71) Applicant: Liberty Mutual Insurance Company, Boston, MA (US)

(72) Inventors: Christopher A. Capone, Stoneham, MA (US); Brian S. Piccolo, Braintree, MA (US); Daniel C. Bernstein, Boston, MA (US); Courtney T. Quinn, Boston, MA (US); Matthew George, Boston, MA (US); Christopher Ralph Tassone, Dover, MA (US)

(73) Assignee: Liberty Mutual Insurance Company, Boston, MA (US)

( * ) Notice: Subject to any disclaimer, the term of this patent is extended or adjusted under 35 U.S.C. 154(b) by 21 days.

This patent is subject to a terminal disclaimer.

(21) Appl. No.: 16/598,014

(22) Filed: Oct. 10, 2019

Related U.S. Application Data

(63) Continuation of application No. 16/389,534, filed on Apr. 19, 2019, which is a continuation of application
(Continued)

(51) Int. Cl.
*G06Q 40/08* (2012.01)
(52) U.S. Cl.
CPC .................................. *G06Q 40/08* (2013.01)
(58) Field of Classification Search
CPC ..................................................... G06Q 40/08
(Continued)

(56) References Cited

U.S. PATENT DOCUMENTS 7,475,024 B1  1/2009  Phan
7,668,738 B2  2/2010  Wiggins
(Continued)

FOREIGN PATENT DOCUMENTS

WO        02/19235 A1    3/2002

OTHER PUBLICATIONS

NonFinal Office Action for U.S. Appl. No. 16/389,534, dated May 19, 2021, (49 pages), United States Patent anti Trademark Office, USA.

(Continued)

*Primary Examiner* — Olabode Akintola
*Assistant Examiner* — Liz P Nguyen
(74) *Attorney, Agent, or Firm* — Alston & Bird LLP

(57) ABSTRACT

Methods, systems, computer program products, and apparatus relating to an item inventory and item replacement are provided. In one embodiment a method for automatic processing of an insurance claim is provided. The method comprises (a) receiving one or more item indicators, each item indicator associated with an item in an insurance claim for an insured party; (b) for a particular item indicator of the one or more item indicators, automatically identifying an item listing associated with the particular item indicator from an item inventory, the item listing identified based at least in part on the particular item indicator; and (c) indicating the item listing as a replacement item for the particular item. Indicating the item listing as a replacement item for the particular item comprises adding the item listing to an electronic shopping cart.

20 Claims, 9 Drawing Sheets

Related U.S. Application Data

No. 14/707,218, filed on May 8, 2015, now Pat. No. 10,311,521.

(60) Provisional application No. 61/991,760, filed on May 12, 2014.

(58) Field of Classification Search
USPC .......................................................... 705/4
See application file for complete search history.

(56) References Cited

U.S. PATENT DOCUMENTS

| | | | |
|---|---|---|---|
| 7,941,330 B1* | 5/2011 | Buentello | G06Q 40/02 705/4 |
| 8,041,636 B1 | 10/2011 | Hunter et al. | |
| 8,069,181 B1 | 11/2011 | Krishnan et al. | |
| 8,527,369 B1 | 9/2013 | Yalamanchi et al. | |
| 8,560,353 B2 | 10/2013 | Smith | |
| 8,694,342 B2 | 4/2014 | Burton et al. | |
| 8,694,501 B1 | 4/2014 | Trandal et al. | |
| 2005/0060236 A1 | 3/2005 | Iulo | |
| 2005/0192833 A1 | 9/2005 | Artinger | |
| 2006/0178902 A1 | 8/2006 | Vicars et al. | |
| 2006/0253351 A1 | 11/2006 | Keaney | |
| 2007/0226018 A1 | 9/2007 | Gross et al. | |
| 2008/0177581 A1 | 7/2008 | Artinger | |
| 2009/0019020 A1 | 1/2009 | Dhillon et al. | |
| 2009/0177499 A1 | 7/2009 | Westerberg et al. | |
| 2009/0265193 A1 | 10/2009 | Collins et al. | |
| 2010/0179837 A1* | 7/2010 | Artinger | G06Q 40/08 715/708 |
| 2010/0191619 A1 | 7/2010 | Dicker et al. | |
| 2010/0250399 A1* | 9/2010 | Williams | G06Q 30/0643 715/788 |
| 2011/0106655 A1* | 5/2011 | Kreiner | G06Q 30/0635 705/26.8 |
| 2011/0153614 A1 | 6/2011 | Solomon | |
| 2011/0161117 A1 | 6/2011 | Busque et al. | |
| 2013/0036029 A1 | 2/2013 | Patt et al. | |
| 2013/0290033 A1 | 10/2013 | Reeser et al. | |
| 2013/0346232 A1 | 12/2013 | Ellison | |

OTHER PUBLICATIONS

U.S. Appl. No. 16/389,534, filed Apr. 19, 2019, Pending.
U.S. Appl. No. 14/707,218, filed May 8, 2015, U.S. Pat. No. 10,311,521, Issued.
U.S. Appl. No. 61/991,760, filed May 12, 2014, Expired.
NonFinal Office Action for U.S. Appl. No. 16/389,534, dated Oct. 29, 2020, (77 pages), United States Patent and Trademark Office, U.S.
Chordas, L., "Replacement Value: The Down Economy Isn't Stopping Carriers From Replacing Their Policy Administration Systems With More Flexible, Web-Enabled Solutions", Best's Review, Jan. 2012, 6 pages, vol. 112, No. 9, A.M. Best Co. Inc., USA. [Retrieved From The Internet Nov. 6, 2015] <http://www.thefreelibrary.com/_/print/PrintArticle.aspx?id=276808564>.
Dekeyser, Stijn. "A Metadata Collection Technique for Documents in WinFS", Proceedings of the Tenth Australasian Document Computing Symposium, Dec. 12, 2005, p. 87, School of Information Technologies, Australia.
U.S. Patent Application, "Concepts for Providing an Insurance Quote", Unpublished (filing date Apr. 2, 2014), (Daniel Carey Bernstein, Inventor) (Liberty Mutual Insurance Company, assignee). „ U.S. Appl. No. 14/242,959.
U.S. Patent Application, "Method, Computer Program Product and System for Proactively Notifying of a Change in a Party's Insurance Needs", Unpublished (filing date Oct. 31, 2006), (Kim Garland, Inventor) (Safeco Insurance Company of America, assignee)., U.S. Appl. No. 11/555,043.
United States Patent and Trademark Office, Final Office Action, U.S. Appl. No. 14/707,218, dated Feb. 2, 2018, (11 pages), USA.
United States Patent and Trademark Office, Final Office Action, U.S. Appl. No. 14/707,255, dated Dec. 19, 2017, (17 pages), USA.
United States Patent and Trademark Office, Final Office Action, U.S. Appl. No. 14/707,255, dated Sep. 24, 2018, (25 pages), USA.
United States Patent and Trademark Office, NonFinal Office Action, U.S. Appl. No. 14/707,218, dated Aug. 10, 2017, (13 pages), USA.
United States Patent and Trademark Office, NonFinal Office Action, U.S. Appl. No. 14/707,218, dated Jun. 13, 2018, (18 pages), USA.
United States Patent and Trademark Office, NonFinal Office Action, U.S. Appl. No. 14/707,255, dated Aug. 2, 2017, (13 pages), USA.
United States Patent and Trademark Office, NonFinal Office Action, U.S. Appl. No. 14/707,255, dated May 3, 2018, (20 pages), USA.
United States Patent and Trademark Office, Notice of Allowance and Fees Due (PTOL-85), U.S. Appl. No. 14/707,218, dated Jan. 22, 2019, (17 pages), USA.
NonFinal Office Action for U.S. Appl. No. 16/389,534, dated Oct. 15, 2021, (52 pages), United States Patent and Trademark Office, USA.
Final Office Action for U.S. Appl. No. 16/389,534, dated Apr. 1, 2022, (29 pages), United States Patent and Trademark Office, USA.

* cited by examiner

FIG. 7

ITEM INVENTORY AND ITEM REPLACEMENT

CROSS-REFERENCE TO RELATED APPLICATIONS

This application claims is a continuation of U.S. application Ser. No. 16/389,534, filed Apr. 19, 2019, which is a continuation of U.S. application Ser. No. 14/707,218, filed May 8, 2015, which issued as U.S. Pat. No. 10,311,521 on Jun. 4, 2019, which claims priority to U.S. Provisional Application Ser. No. 61/991,760, filed May 12, 2014, the contents of which are hereby incorporated herein in their entireties.

BACKGROUND

The process for filing and adjusting personal property claims is manual and time consuming. Typically, policyholders or customers must create and validate a list of lost, damaged, or stolen property associated with a claim that is then submitted to a claims adjuster. For items that cannot be priced or replaced by a vendor, the claims adjuster manually conducts an appraisal for each item before a reimbursement is issued to the policyholder or customer. The amount of reimbursement is defined by the replacement value of the original item or an item of like kind and quality. A policyholder may choose to replace the item through a vendor, replace the item himself or herself, or accept a cash value for the item which is calculated/determined as replacement value less depreciation. If the policyholder or insurance customer chooses to replace an item himself or herself, he or she can be reimbursed for the lesser of the purchase price of the item or the established replacement value of the item. Additionally, a policyholder or customer may have purchased one or more items that are not covered under the policyholder or customer's existing policy. If a loss of one or more of these newer items occurs, the policyholder or customer may be frustrated to learn that items are not covered under the existing policy.

Thus, there is a need in the art for methods, apparatus, systems, and computer program products for improving the claims process.

BRIEF SUMMARY

In general, embodiments of the present invention provide methods, apparatus, systems, computing devices, computing entities, and/or the like for the improved and efficient filing and processing of insurance claims.

In various embodiments, the present invention may proactively identify & notify customers of underinsurance scenarios. In various embodiments, the present invention may provide a grace period of coverage for newly purchased items. In various embodiments, an automated, partially automated, and/or electronic method or system for compiling and filing an insurance claim may be provided. In some embodiments, an automated, partially automated, and/or electronic method or system for processing and calculating/determining the claim and/or providing reimbursement may be provided.

In one aspect of the present invention, a method for automatic processing of an insurance claim. In one embodiment, the method comprises (a) receiving one or more item indicators, each item indicator associated with an item in an insurance claim for an insured party; (b) for a particular item indicator of the one or more item indicators, automatically identifying an item listing associated with the particular item indicator from an item inventory, the item listing identified based at least in part on the particular item indicator; and (c) indicating the item listing as a replacement item for the particular item. Indicating the item listing as a replacement item for the particular item comprises adding the item listing to an electronic shopping cart.

In another aspect of the present invention, a system for automatic processing of an insurance claim is provided. In one embodiment, the system comprises at least one memory device and at least one processor. The system is configured to at least (a) receive one or more item indicators, each item indicator associated with an item in an insurance claim for an insured party; (b) for a particular item indicator of the one or more item indicators, automatically identify an item listing associated with the particular item indicator from an item inventory, the item listing identified based at least in part on the particular item indicator; and (c) indicate the item listing as a replacement item for the particular item. Indicating the item listing as a replacement item for the particular item comprises adding the item listing to an electronic shopping cart.

In yet another aspect of the present invention, a computer program product for automatic processing of an insurance claim is provided. In one embodiment, the computer program product comprises at least one non-transitory computer-readable storage medium having computer-readable program code portions stored therein. The computer-readable program code portions comprise (a) an executable portion configured to receive one or more item indicators, each item indicator associated with an item in an insurance claim for an insured party; (b) an executable portion configured to receive, for a particular item indicator of the one or more item indicators, automatically identify an item listing associated with the particular item indicator from an item inventory, the item listing identified based at least in part on the particular item indicator; and (c) an executable portion configured to indicate the item listing as a replacement item for the particular item. Indicating the item listing as a replacement item for the particular item comprising adding the item listing to an electronic shopping cart.

In still another aspect of the present invention, a method for creating and maintaining a home inventory is provided. In one embodiment, the method comprises (a) receiving one or more item indicators configured to identify an item owned by an insured party; (b) for each of the one or more item indicators, identifying the corresponding item; (c) updating an item listing comprising the corresponding item for each of the one or more item indicators; (d) for each item of the item listing, populating one or more fields with data associated with the item; and (e) storing the item listing in association with the insured party.

In another aspect of the present invention, a system for creating and maintaining a home inventory is provided. In one embodiment, the system comprises at least one memory device and at least one processor. The system is configured to at least (a) receive one or more item indicators configured to identify an item owned by an insured party; (b) for each of the one or more item indicators, identify the corresponding item; (c) update an item listing comprising the corresponding item for each of the one or more item indicators; (d) for each item of the item listing, populate one or more fields with data associated with the item; and (e) store the item listing in association with the insured party.

In yet another aspect of the present invention, a computer program product for creating and maintaining a home inventory is provided. In one embodiment, the computer program product comprises at least one non-transitory computer-readable storage medium having computer-readable program code portions stored therein. The computer-readable program code portions comprising (a) an executable portion configured to receive one or more item indicators configured to identify an item owned by an insured party; (b) an executable portion configured to, for each of the one or more item indicators, identify the corresponding item; (c) an executable portion configured to update an item listing comprising the corresponding item for each of the one or more item indicators; (d) an executable portion configured to, for each item of the item listing, populate one or more fields with data associated with the item; and (e) an executable portion configured to store the item listing in association with the insured party.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 4:
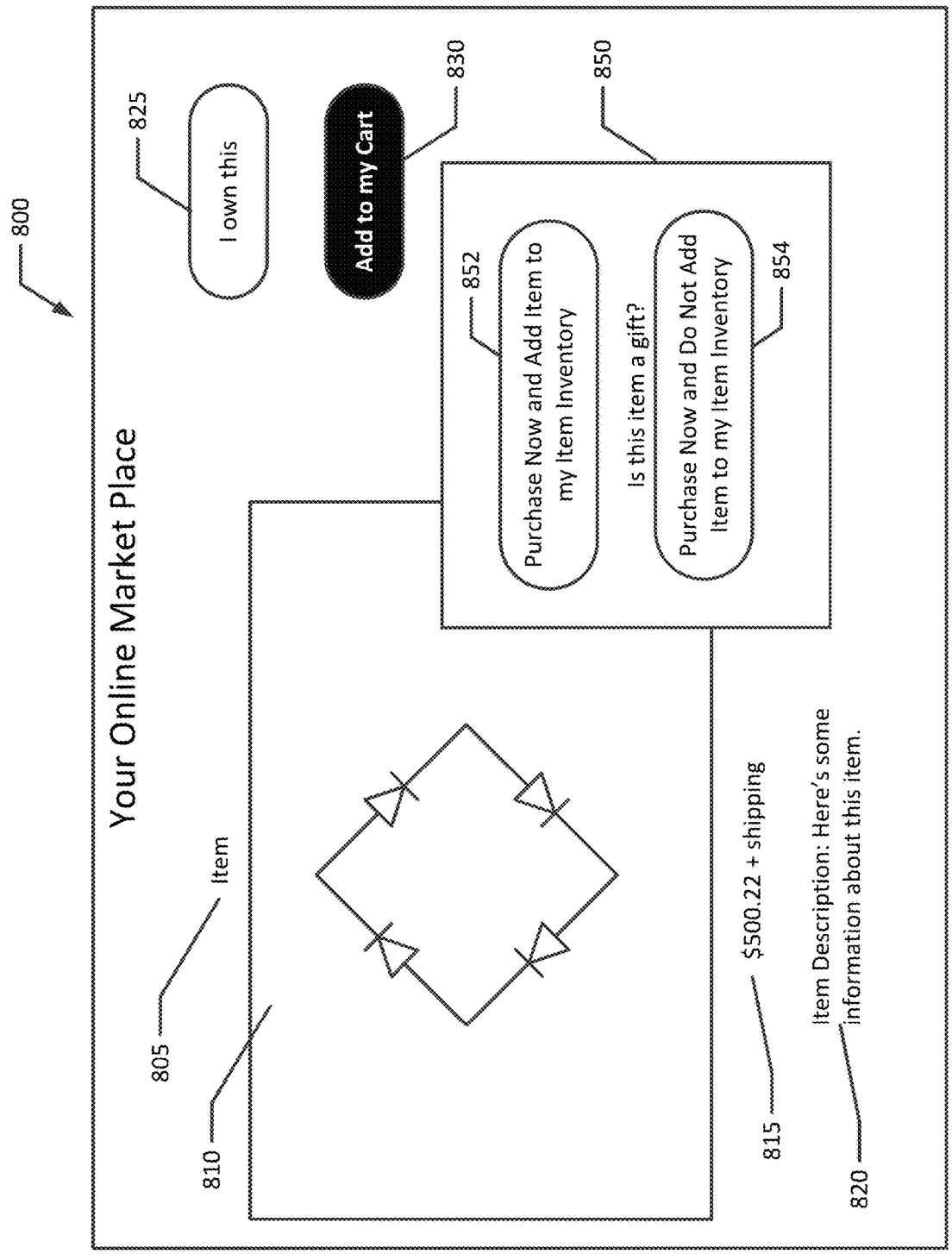

FIGS. 3, 5, 6, 8, and 9 provide flowcharts illustrating operations and processes that can be used in accordance with various embodiments of the present invention;

Figure 7:
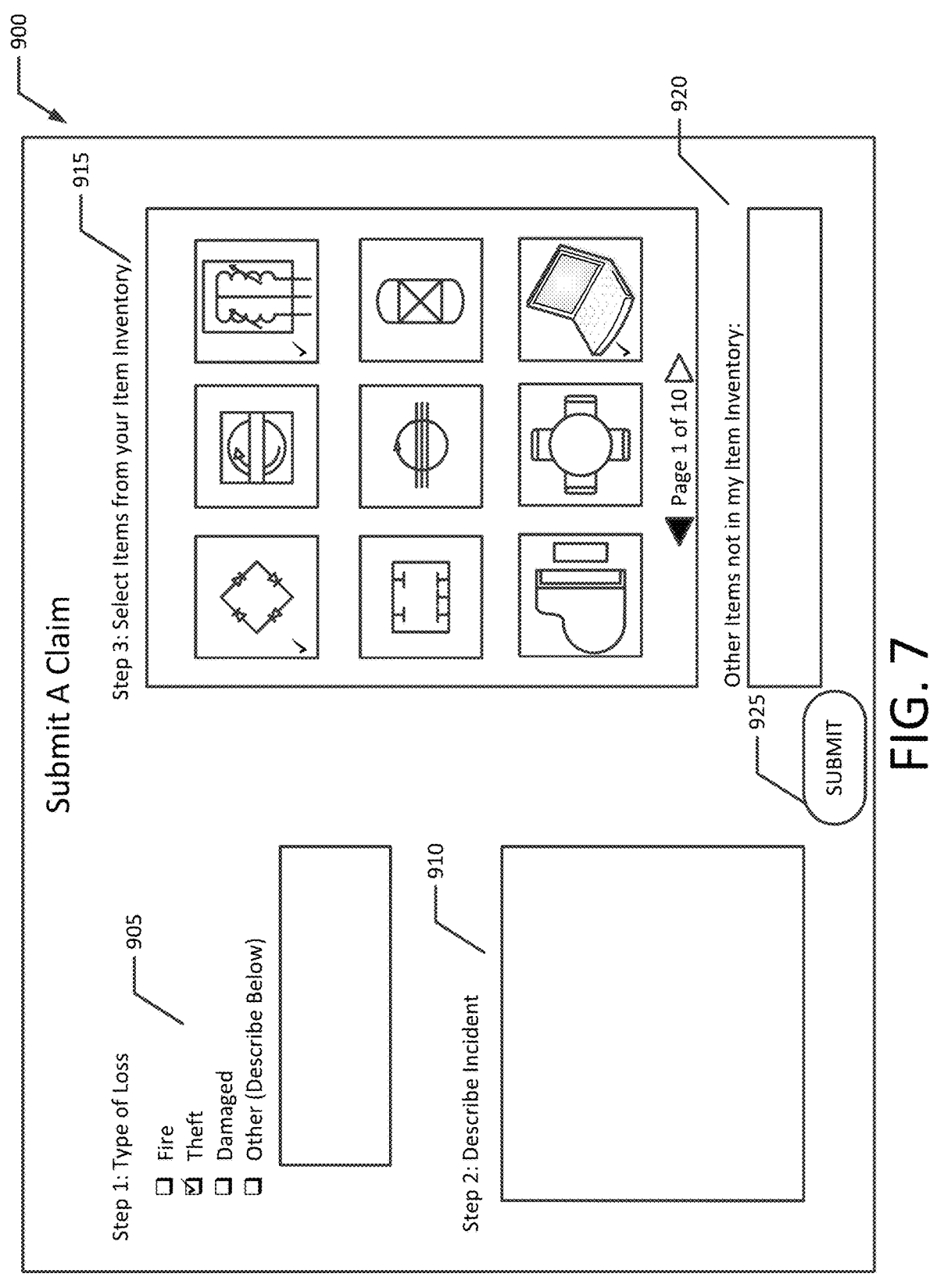

FIGS. 4 and 7 provide example views of a user interface provided in accordance with various embodiments of the present invention.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. GENERAL OVERVIEW

Embodiments of the present invention are directed to various concepts for compiling, filing, processing, calculating/determining and reimbursing insurance claims. In various embodiments, a policy holder, potential policy holder, prospect, or insurance customer (referred to herein as a user) may compile an item inventory of goods, items, property, and/or the like owned by or associated with the user and/or covered by an insurance plan owned by or associated with the user. The item inventory may be compiled automatically, partially automatically, semi-automatically, electronically, and/or the like. After the user has experienced a loss, the item inventory may be used to automatically, partially automatically, semi-automatically, and/or electronically generate and submit an insurance claim. In various embodiments, the appraisal and reimbursement system may be automated, partially automated, semi-automated, and/or the like. The policyholder or insurance customer may request the reimbursement via traditional methods (e.g., check, pre-paid debit card, bank transfer, replacement items, and/or the like) or may request electronic reimbursement. In various embodiments, if a policyholder or insurance customer requests electronic reimbursement, an online shopping cart (also referred to as an electronic list) associated with a user's account with a retailer may be populated with the appropriate options for replacement items. The user's account with the retailer may then be credited with the cash value of the items associated with the claim for general purchases or with the replacement value of items associated with the claim for purchases of replacement items. In various embodiments, as a result of a strategic partnership with a specified retailer, the amount credited to a user's account may be larger than what would have been ordinarily provided through traditional indemnification methods. In various embodiments, when a user purchases a new item, a grace period may also be provided in the event that a loss occurs during the grace period associated with the new item. For example, if a loss associated with the new item occurs during the grace period, the loss may be automatically covered during the grace period. The policyholder or insurance customer will be proactively notified of underinsurance situations and encouraged to increase limits to avoid dissatisfaction. In some embodiments, the loss will be covered in accordance with a new or updated policy purchased by the user after the loss occurred.

III. EXEMPLARY SYSTEM ARCHITECTURE

Figure 1:
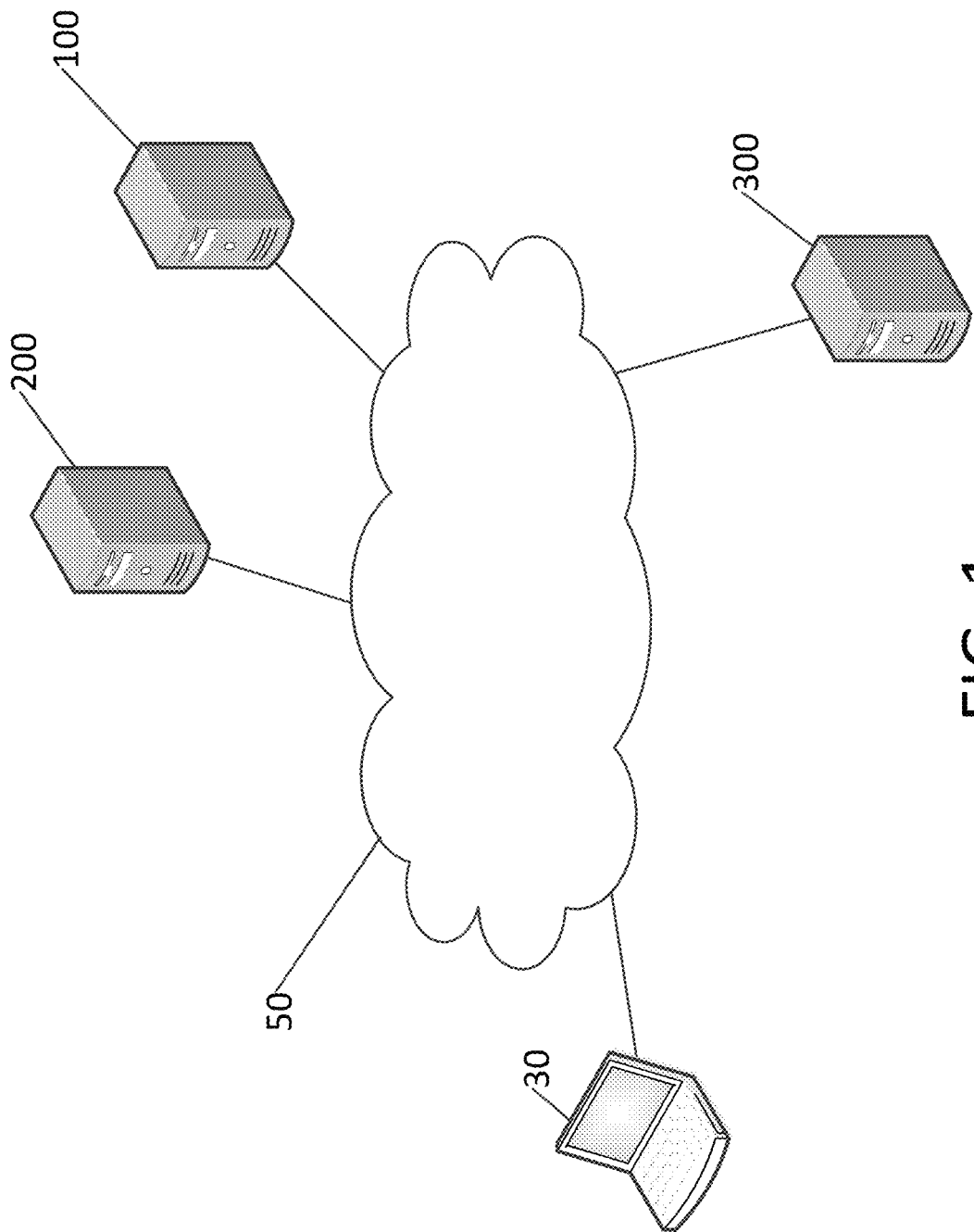
FIG. 1 is an overview of a system that can be used to practice embodiments of the present invention.

FIG. 1 provides an illustration of an exemplary embodiment of the present invention. As shown in FIG. 1, this particular embodiment may include one or more claims systems 100, one or more networks 50, one or more user computing entities 30, one or more retailer/market systems 200, and one or more external information/data source systems 300. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Claims Systems 100

Figure 2:
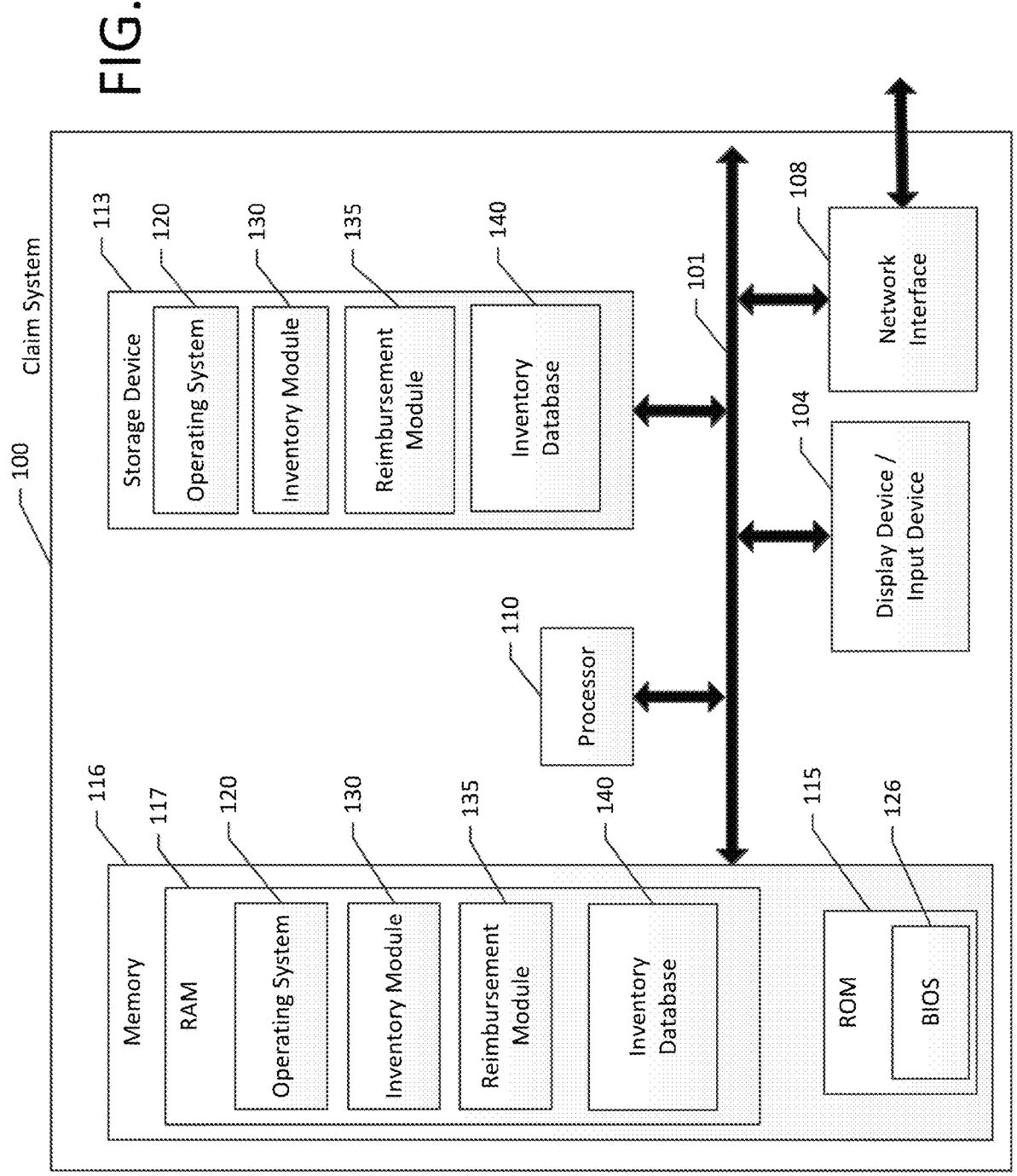
FIG. 2 is an exemplary schematic diagram of a claims system according to one embodiment of the present invention.

A claims system 100 may be operated by and/or on behalf of an insurance provider or other individual or organization that may receive and/or process insurance claims. In various embodiments, multiple claims systems 100 may be used for receiving and/or processing insurance claims. FIG. 2 shows a schematic diagram of an example claims system 100. In general, the term system, device, entity, and similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the claims system 100 may also include one or more communications interfaces for communicating with various computing entities, such as by communicating data, content, information, and/or similar terms used herein interchangeably that can be transmitted, received, operated on, processed, displayed, stored, and/or the like. For instance, the claims system 100 may communicate with one or more user computing entities 30, one or more retailer/market systems 200, and/or one or more external information/data source systems 300.

In one embodiment, the claims system 100 may include or be in communication with one or more processing elements 110 (also referred to as processors, processing circuitry, and/or similar terms used herein interchangeably) that communicate with other elements within the claims system 100 via a bus 101, for example. As will be understood, the processing element 110 may be embodied in a number of different ways. For example, the processing element may be embodied as one or more complex programmable logic devices (CPLDs), microprocessors, multi-core processors, coprocessing entities, application-specific instruction-set processors (ASIPs), and/or controllers. Further, the processing element 110 may be embodied as one or more other processing devices or circuitry. The term circuitry may refer to an entirely hardware embodiment or a combination of hardware and computer program products. Thus, the processing element 110 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 110 may be configured for a particular use or configured to execute instructions stored in volatile or non-volatile media or otherwise accessible to the processing element. As such, whether configured by hardware or computer program products, or by a combination thereof, the processing element 110 may be capable of performing steps or operations according to embodiments of the present invention when configured accordingly.

In one embodiment, the claims system 100 may further include memory or be in communication with memory 116, which may comprise non-volatile media (also referred to as non-volatile storage, memory, memory storage, memory circuitry and/or similar terms used herein interchangeably). In one embodiment, the non-volatile storage or memory 116 may include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. For example, the non-volatile storage or memory may store code including an inventory module 130 and/or a reimbursement module 135. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like. For example, the non-volatile storage or memory may comprise an inventory database 140.

In one embodiment, the memory 116 may further comprise volatile media (also referred to as volatile storage, memory, memory storage, memory circuitry and/or similar terms used herein interchangeably). In one embodiment, the volatile storage or memory may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element. Thus, the databases, database instances, database management systems, data, applications, programs, program modules, scripts, source code, object code, byte code, compiled code, interpreted code, machine code, executable instructions, and/or the like may be used to control certain aspects of the operation of the claims system 100 with the assistance of the processing element 110 and operating system 120.

In various embodiments, memory 116 can be considered primary memory such as RAM memory or other forms which retain the contents only during operation, or it may be a non-volatile memory, such as ROM, EPROM, EEPROM, FLASH, or other types of memory that retain the memory contents. In some embodiments, the disk storage may communicate with the processor 110 using an I/O bus instead of a dedicated bus. The memory 116 could also be secondary memory, such as disk storage, that stores a relatively large amount of data. The secondary memory may be a floppy disk, hard disk, compact disk, DVD, or any other type of mass storage type known to those skilled in the computer arts. The memory 116 may also comprise any application program interface, system, libraries and any other data by the processor to carry out its functions. ROM 115 is used to store a basic input/output system 126 (BIOS), containing the basic routines that help to transfer information/data between components of the claims system 100, including the inventory module 130, the reimbursement module 135, the inventory database 140, and/or the operating system 120.

In addition, the claims system 100 includes at least one storage device 113, such as a hard disk drive, a floppy disk drive, a CD-ROM drive, or optical disk drive, for storing information/data on various computer-readable media, such as a hard disk, a removable magnetic disk, or a CD-ROM disk. As will be appreciated by one of ordinary skill in the art, each of these storage devices 113 is connected to the system bus 101 by an appropriate interface. It is important to note that the computer-readable media described above could be replaced by any other type of computer-readable media known in the art. Such media include, for example, memory sticks (e.g., USB memories), magnetic cassettes, flash memory cards, digital video disks, and Bernoulli cartridges.

A number of program modules may be stored by the various storage devices and within RAM 117. Such program modules include the operating system 120, the inventory module 130, and/or the reimbursement module 135. Those skilled in the art will appreciate that other modules may be present in RAM 117 to effectuate the various embodiments of the present invention. Furthermore, the functions of the inventory module 130 and/or the reimbursing module 135 need not be modular.

Also located within the claims system 100 is a network interface 108, for interfacing and communicating with other elements of a computer network, such as by communicating data, content, information, and/or similar terms used herein interchangeably that can be transmitted, received, operated on, processed, displayed, stored, and/or the like. For instance, the claims system 100 may be in communication with one or more user computing entities 30. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the claims system 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols, wireless universal serial bus (USB) protocols, and/or any other wireless protocol.

Various information/data can be received by the claims system 100 via the network interface 108 and/or input/output device 104. This information/data may include information/data related to a property to be insured, information/data related to a user who would like to insure a property, underwriting business rules, and/or the like. This input information/data may vary, however, depending on the configuration and informational requirements of the claims system 100.

As mentioned above, the claims system 100 also includes an input/output device 104 for receiving and displaying data. The claims system 100 may include or be in communication with one or more input elements, such as a keyboard input, a mouse input, a touch screen/display input, audio input, pointing device input, joystick input, keypad input, and/or the like, as indicated by input/output device 104. The claims system 100 may also include or be in communication with one or more output elements, as indicated by input/output device 104, such as audio output, video output, screen/display output, motion output, movement output, and/or the like.

In various embodiments, the claims system 100 may be configured to generate and/or provide insurance quotes. The claims system 100 may be further configured to access information/data related to a property to be determined, possibly via one or more retailer/market systems 200. Additionally, the claims system 100 may be configured to provide the insurance quote to the user computing entity 30. The claims system 100 may be configured to be in communication with one or more retailer/market systems 200, one or more external information/data source systems 300, and/or one or more user computing entities 30.

The claims system 100 may also comprise, be associated with, or be in communication with various other internal systems, such as a claims system for receiving and administering insurance claims, an underwriting system, and a variety of other systems and their corresponding components.

Those skilled in the art will recognize that many other alternatives and architectures are possible and can be used to practice various embodiments of the invention. The embodiment illustrated in FIG. 2 can be modified in different ways or incorporated within a network and be within the scope of the invention. For example, one or more components of the claims system 100 may be located remotely from other claims system 100 components, such as in a distributed system. Furthermore, one or more of the components may be combined and additional components performing functions described herein may be included or associated with the claims system 100. Thus, the claims system 100 can be adapted to accommodate a variety of needs and circumstances.

2. Exemplary User Computing Entities 30

A user may be an individual, a family, a company, an organization, an entity (e.g., business), a department within an organization, a representative of an organization and/or person, and/or the like. For example, in one context, a user may be a policyholder or insurance customer. A user or an agent of the user may operate a user computing entity 30 that includes one or more components that are functionally similar to those of the claims system 100. For example, in one embodiment, each user computing entity 30 may include one or more processing elements, one or more display device/input devices, volatile and non-volatile storage or memory, and/or one or more communications interfaces.

The user computing entity 30 may also comprise a user interface (that can include a display coupled to a processing element) and/or a user input interface (coupled to a processing element). For example, the user interface may be a user application, browser, user interface, interface, and/or similar words used herein interchangeably executing on and/or accessible via the user computing entity 30 to interact with and/or cause display of information from other computing entities, as described herein. The user input interface can comprise any of a number of devices or interfaces allowing the user computing entity 30 to receive data, such as a keypad (hard or soft), a touch display, voice/speech or motion interfaces, or other input device. In embodiments including a keypad, the keypad can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the user computing entity's 30 position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, Bluetooth Smart, NFC transmitters, and/or the like. These indoor positioning aspects can be used in a variety of settings to determine the location of someone or something to within inches or centimeters.

These architectures and examples are provided for exemplary purposes only and are not limiting to the various embodiments. As indicated, the term computing entity or device may refer to one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. In various embodiments, the user computing entity 30 may be configured to communicate with a claims system 100, retailer/market system 200, and/or other computing devices via a wired or wireless network. As will be recognized, these architectures and descriptions are provided for exemplary purposes only and are not limiting to the various embodiments.

3. Exemplary Retailer/Market Systems 200

In one embodiment, various entities may operate retailer/market systems 200. For example, a system storing product information (e.g., universal product code (UPCs), stock keeping units (SKUs), current and/or historical product prices, product prices based on geographical location, product evaluations or reviews, product depreciation information, product descriptions, product images, and/or the like), a system operated by and/or on behalf of a retailer or ecommerce entity (e.g., Amazon, eBay, Target, online only retailers, brick and mortar retailers with an online presence, and/or the like), and/or the like may each be a retailer/market system 200. A retailer/market system 200 may include one or more components that are functionally similar to those of the claims system 100 and/or the user computing entity 30. For example, in one embodiment, each retailer/market system 200 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. For example, the claims system 100 may communicate or interact with any number of retailer/market systems 200 via their respective communication interfaces information/data. This may also enable the retailer/market system 200 to communicate with various other computing entities, such as user computing entities 30, and/or various other computing entities. As will be recognized, these architectures and descriptions are provided for exemplary purposes only and are not limiting to the various embodiments.

4. Exemplary External Information/data Source System 300

In one embodiment, various entities may operate external information/data source 300. For example, a system storing product information (e.g., UPC codes, SKUs, current and/or historical product prices, product prices based on geographical location, product evaluations or reviews, product depreciation information, product descriptions, product images, and/or the like), a system operated by and/or on behalf of a retailer or ecommerce entity (e.g., Amazon, eBay, Target, online only retailers, brick and mortar retailers with an online presence, and/or the like), a system storing consumer information related to one or more items and/or the like may each be an external data source 300. An external data source 300 may include one or more components that are functionally similar to those of the claims system 100, retailer/market system 200, and/or the user computing entity 30. For example, in one embodiment, each external data source 300 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. For example, the claims system 100 may communicate or interact with any number of external data sources 300 via their respective communication interfaces information/data. This may also enable the external data source 300 to communicate with various other computing entities, such as user computing entities 30, and/or various other computing entities. As will be recognized, these architectures and descriptions are provided for exemplary purposes only and are not limiting to the various embodiments.

IV. Exemplary System Operation

As noted above, below, in the figures, in various embodiments, a user (e.g., a prospect, potential policy holder, policyholder, insurance customer, and/or the like) may automatically, partially automatically, semi-automatically, and/or electronically create an item inventory of goods, items, property, and/or the like owned by the user and/or covered by an insurance policy owned by or associated with the user. The item inventory may be used to automatically, partially automatically, semi-automatically, and/or electronically generate and submit an insurance claim after a loss occurs. In various embodiments, the appraisal and reimbursement processes may also be automated, partially automated, semi-automated, and/or completed electronically. In various embodiments, a grace period may be implemented. If a user purchases an item that is not covered or not sufficiently covered under the existing policy and a loss occurs associated with the item during the grace period, the loss may be reimbursed and/or the item may be replaced in accordance with a policy covering the item purchased after the loss occurred. The user will be proactively notified of underinsurance situations and encouraged to increase limits to avoid dissatisfaction. Various aspects of the operation of the present invention will now be described in detail.

1. Creating and Maintaining an Item Inventory

Figure 3:
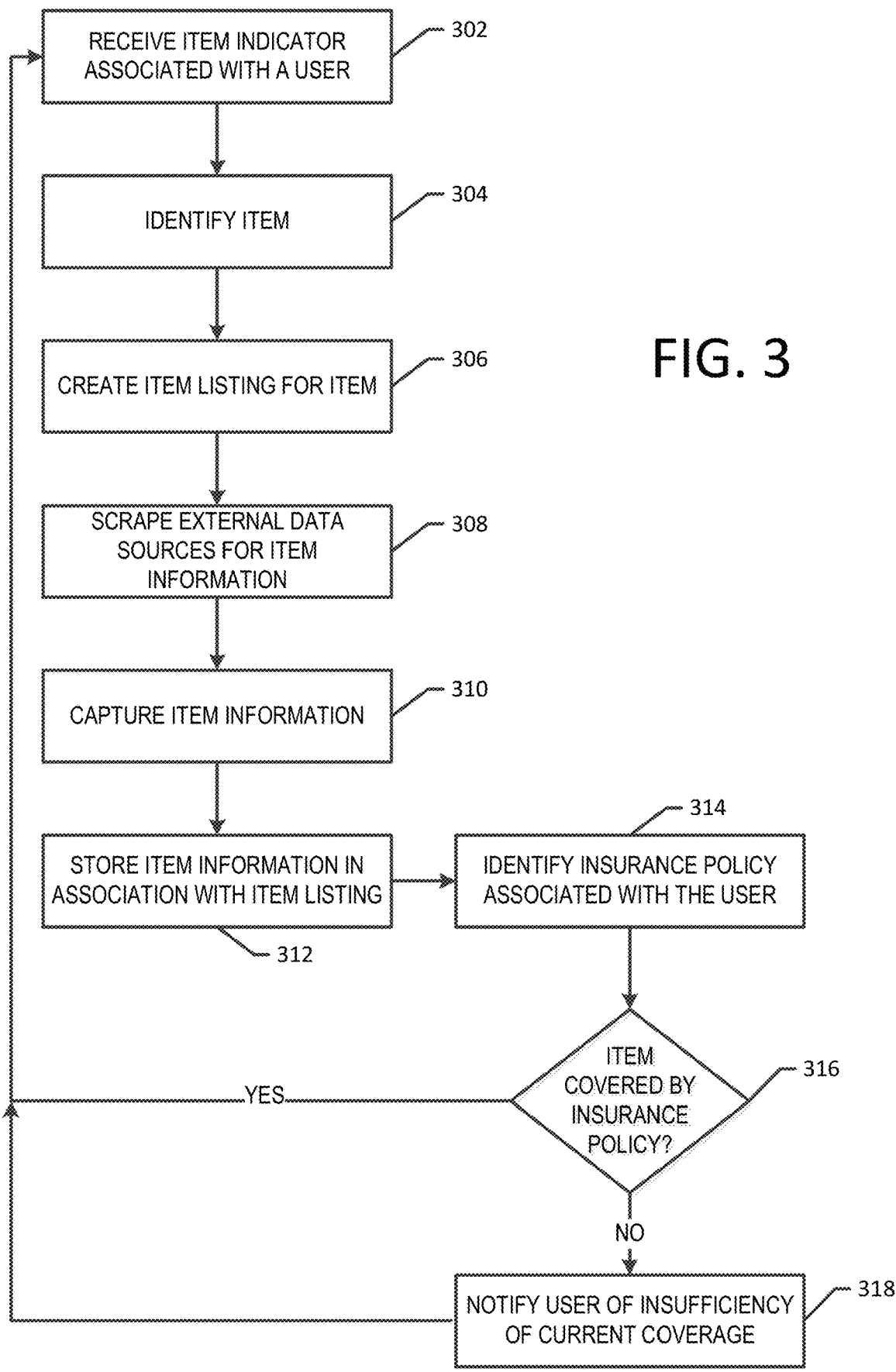

FIG. 3 provides a flowchart of process and operations that may be completed in various embodiments of the present invention to create and/or maintain an item inventory. In various embodiments, a user may create and maintain an item inventory. In other embodiments, the item inventory may be automatically created and maintained on behalf of the user. In some embodiments, the item inventory is created and maintained via a combination of automatic and user-initiated actions. In various embodiments, an inventory may be created and/or maintained to inventory items owned by or in the possession of the user or a family, group, organization, company, department of a company, and/or the like with which the user is associated. For example, the items may be owned by an insured party comprising the user and/or associated with the user. In various embodiments, the item inventory may comprise one or more item listings, with each item listing associated with an item owned by, in the possession of and/or the like the user or family, group, organization, company, department of a company, and/or the like that the user is associated with. The item inventory may be created after, in response to, and/or upon the creation of the first item listing comprising the item inventory. The item inventory may be expanded and/or maintained via the addition of item listings. In various embodiments, a user may be able to edit and/or delete item listings as appropriate and/or complete other maintenance tasks.

For example, a user operating a user computing entity 30 may access a user interface via a mobile application, a downloaded application or program, via the Internet, a web browser, a dedicated window, and/or the like. The user interface may be configured to automate and/or partially automate the creation of an item inventory. For example, the user may operate a user computing entity 30 having image capture capabilities (e.g., a smartphone, camera phone, tablet, digital camera that may be connected to a computer, and/or the like) to capture image data of UPCs, SKUs, barcodes, text, tags, character strings, Aztec Codes, Maxi-Codes, Data Matrices, Quick Response (QR) Codes, and/or the like (e.g., item indicators) associated with various goods, items, and/or property owned by and/or associated with the user or the user's insurance policy. In some embodiments, image data may be captured of the item itself, item packaging, or a receipt for purchase of the item. For example, the user computing entity 30 may provide the captured image data to the claims system 100 as an item indicator.

In another embodiment, an application may run as a plug-in and/or the like with a browser operating on the user computing entity 30. For example, a user (e.g., operating a user computing entity 30) may browse and/or search an online/electronic catalog (e.g., ebay.com, amazon.com, bestbuy.com, etc.), as shown in FIG. 4. The browser 800 may display an item name 805, an image of the item 810, a price for purchase of the item 815, a description of the item 820, and/or the like. When the user (e.g., operating a user computing entity 30) selects the add to my cart button 830, a pop-up window and/or the like 850 may be displayed. The pop-up window 850 provides the user (e.g., operating the user computing entity 30) with the option of purchasing the item and adding the item to the user's item inventory (e.g., by selecting the purchase now and add to my item inventory button 852) or purchasing the item and not adding the item to the user's item inventory (e.g., by selecting the purchase now and do not add item to my item inventory button 854). Thus, if a user is purchasing a gift (e.g., a wedding present, birthday present, holiday present, and/or the like) the user may purchase the item without the item being added to the user's item inventory. If the user selects to purchase the item and add the item or the user's item inventory, the browser may forward an item indicator for the purchased item to the claims system 100, such that the item may be added to the user's item inventory. In some embodiments, any time a user (e.g., operating a user computing entity 30) purchases an item via the browser, for example, the browser may forward an item indicator for the purchased item to the claims system 100. If the user is browsing or searching an online/electronic catalog, for example as illustrated in FIG. 4, the user may be able to select the I own this item button 825 when viewing an item in an online/electronic catalog to have an item indicator provided to the claims system 100 for the item.

In yet another embodiment, a user's email may be monitored or scraped for receipts that are emailed to the user (e.g., emailed receipts for items purchased online or in person). Information related to the item(s) indicated on the receipt may be provided to the claims system 100 as an item indicator. In other embodiments, the user (e.g., operating a user computing entity 30) may manually provide to the claims system 100 identifying information identifying products, items, goods, and/or property owned by and/or associated with the user as an item indicator.

Returning to FIG. 3, at step 302, an item indicator is received. For example, the claims system 100 (or any other appropriate computing entity) may receive an item indicator. For example, a user (e.g., operating a user computing entity 30) may provide an item indicator in the form of image data of a barcode (e.g., UPC, SKU, and/or the like) associated with an item (e.g., captured via an image capture device associated with the user computing entity 30), capture image data of the item (e.g., captured via an image capture device associated with the user computing entity 30), select an item from a catalog of items (e.g., via a user input mechanism associated with the user computing entity 30), enter item information (e.g., via a user input mechanism associated with the user computing entity 30), and/or the like. The user computing entity 30 may then provide the item indicator to the claims system 100. For example, the user may access a user interface via the user computing entity 30, browse and/or search a catalog of items, and to select one or more items. The user computing entity 30 may provide item indicators for each selected item to the claims system 100. In another example, an email scraper program operating on the user computing entity 30 or another computing entity may identify an electronic receipt received by an email inbox associated with the user and may provide information from the electronic receipt to the claims system 100. Thus, in various embodiments, the claims system 100 may receive an item indicator of an item owned by, recently purchased by, and/or otherwise associated with the user automatically or through user action.

At step 304, the item associated with the item indicator is identified. For example, the claims system 100 (or any other appropriate computing entity) may identify the item associated with the item indicator. For example, if the item indicator is image data of a barcode associated with the item, the claims system 100 may analyze the image data, extract the barcode, and identify the item based on the barcode (e.g., look up the barcode in a UPC database stored by the claims system 100, one or more retailer/market systems 200, and/or one or more external information/data source systems 300). If the item indicator is image data of the item, the claims system 100 may use an image recognition algorithm, image matching software, image analysis software and/or the like to identify the item. For example, the claims system 100 may access images from one or more external information/data source systems 300 and compare the received image data with one or more of the accessed images to identify the item associated with the item indicator. If the item indicator is user selection (e.g., via a user computing entity 30) of an item in an online/electronic catalog, the claims system 100 may identify the item based on the user-selected item. If the item indicator is user entered item information, the claims system 100 may identify the item associated with the item indicator may comparing the provided item information with information corresponding to one or more product entries in an online/electronic catalog (e.g., provided by one or more external information/data source systems 300, and/or the like). If the item indicator is information from an electronic receipt provided by an email scraper program, the item indicator may comprise an item code and/or other item information that the claims system 100 may use to identify the item.

At step 306, an item listing may be created for the item. For example, the claims system 100 may create an item listing for the item and store the item listing in memory associated with the claims system 100 (e.g., memory 116 and/or the like). In various embodiments, the item listing may be based on a template item listing. For example, the template item listing may comprise various item information/data, such as a set of information/data fields, some of which may be required and some of which may be optional. For example, the template may include the fields item name, manufacturer, date item manufactured, place of manufacture, date of purchase, purchase price, market value, item quality, current item condition, item condition at time of purchase, retailer item was purchased from, item use information, item storage information, item size, item dimensions, item characteristics, keywords, item description, UPC, SKU, serial number, replacement item indicator, replacement value, depreciation schedule/table, similar items, special handling instructions, current item value, digital image of the item, user provided item name and/or the like. In one embodiment, the item listing template comprises a field for a hypertext link to an online/electronic catalog listing for the replacement item and/or other identifier of a replacement item. For example, the item listing template may comprise a field for a replacement item indicator (e.g., a UPC, SKU, item name, item description, digital image, item quality indicator, item condition indicator, and/or the like) In various embodiments, the template item listing used to create the item listing may be based on a category associated with the item (e.g., furniture, clothing, jewelry, electronics, property, vehicle, etc.).

At step 308, external information/data sources may be accessed to gather item information/data associated with the item. For example, the claims system 100 may access external information/data via an external information/data source system 300 to gather item information/data. For example, the claims system 100 may search for item information/data to complete at least the required fields of the item listing. At step 310 the item information/data is captured from the external information/data source(s) and at step 312 the item information/data is stored in association with the item listing. For example, the claims system 100 may capture and store the item information/data in association with the item listing. For example, in one embodiment, the claims system 100 may identify a replacement item in an online/electronic catalog based on an item value, item dimensions, manufacturer, special handling instructions, item quality, item name, item description, item keyword, UPC code, replacement item indicator, or digital image of the item. A hypertext link or other catalog listing identifier associated with the catalog listing of the identified replacement item may be stored in association with the item listing to allow for easy processing of claims and/or replacement of a loss associated with the item. In various embodiments, if the claims system 100 is unable to capture enough item information/data to complete the required fields of the item listing, the claims system 100 may request additional item information from the user (e.g., via the user computing entity). In various embodiments, the claims system 100 may update the item listing based on the information associated with the item found in the emailed receipts or purchase history data from the retailer (e.g., access via retailer/market system 200). It should be understood that a variety of methods may be used by the claims system 100 to gather item information/data. In various embodiments, the user computing entity 30 may capture and/or provide at least some item information/data to the claims system 100. The item listing and/or corresponding item inventory may then be stored by the claims system 100 (e.g., in the inventory database 140) or an associated system.

In various embodiments, at step 314, an insurance policy associated with the user may be identified. For example, the claims system 100 may identify an insurance policy associated with the user. For example, if the user is a homeowner, condo owner, or renter and the item is a household item (e.g., a couch, television, piece of jewelry, rug, guitar, and/or the like), a homeowner's, condo owner's, or renter's insurance policy associated with the user may be identified. At step 316, it is determined if the item is covered by the identified insurance policy. For example, the claims system 100 may determine if the item is covered by the identified insurance policy. In various embodiments, the determination of whether an item is covered by the identified insurance policy may be based at least in part on the terms of the insurance policy, item information/data stored in association with the item listing associated with the item, other item listings associated with the item inventory, and/or the like. For example, the user may have an insurance policy having a $1,000 coverage limit for jewelry, watches, furs, and precious and semi-precious stones. If the user already owns $900 of items falling into that category, according to the item inventory associated with the user, and the user buys a necklace worth $300, the claims system 100 may determine that the necklace will not be fully covered under the user's current insurance policy.

If at step 316 it is determined that the item is not covered by the user's current insurance policy, the user may be notified that the item is not covered by the user's current insurance policy. For example, the user may be notified that the current insurance policy associated with the user has a $1,000 limit for jewelry, furs, and precious and semi-precious stones, and that if the user would like the recently purchased necklace to be covered by the user's insurance policy, the insurance policy will need to be updated. As should be understood, a variety of communication methods may be used to notify the user including, but not limited to, email, text message, voice message, paper mail, social media message, push notification (e.g., via an app operating on a smartphone or tablet), and/or the like. In various embodiments, the notification may include a bendable or non-bindable quote for an updated insurance policy that would provide more sufficient coverage for a user's items as represented by the user's item inventory. The notification may also include a mechanism for accepting the provided quote (e.g., a link that the user may follow to accept the quoted insurance policy) For example, methods similar to those described in U.S. application Ser. No. 11/555,043 and U.S. application Ser. No. 14/242,959, both of which are incorporated by reference herein in their entireties, may be used provide the user with a quote for an updated insurance policy and provide the user with a mechanism for accepting the provided quote.

2. Interim Insurance Coverage

Figure 5:
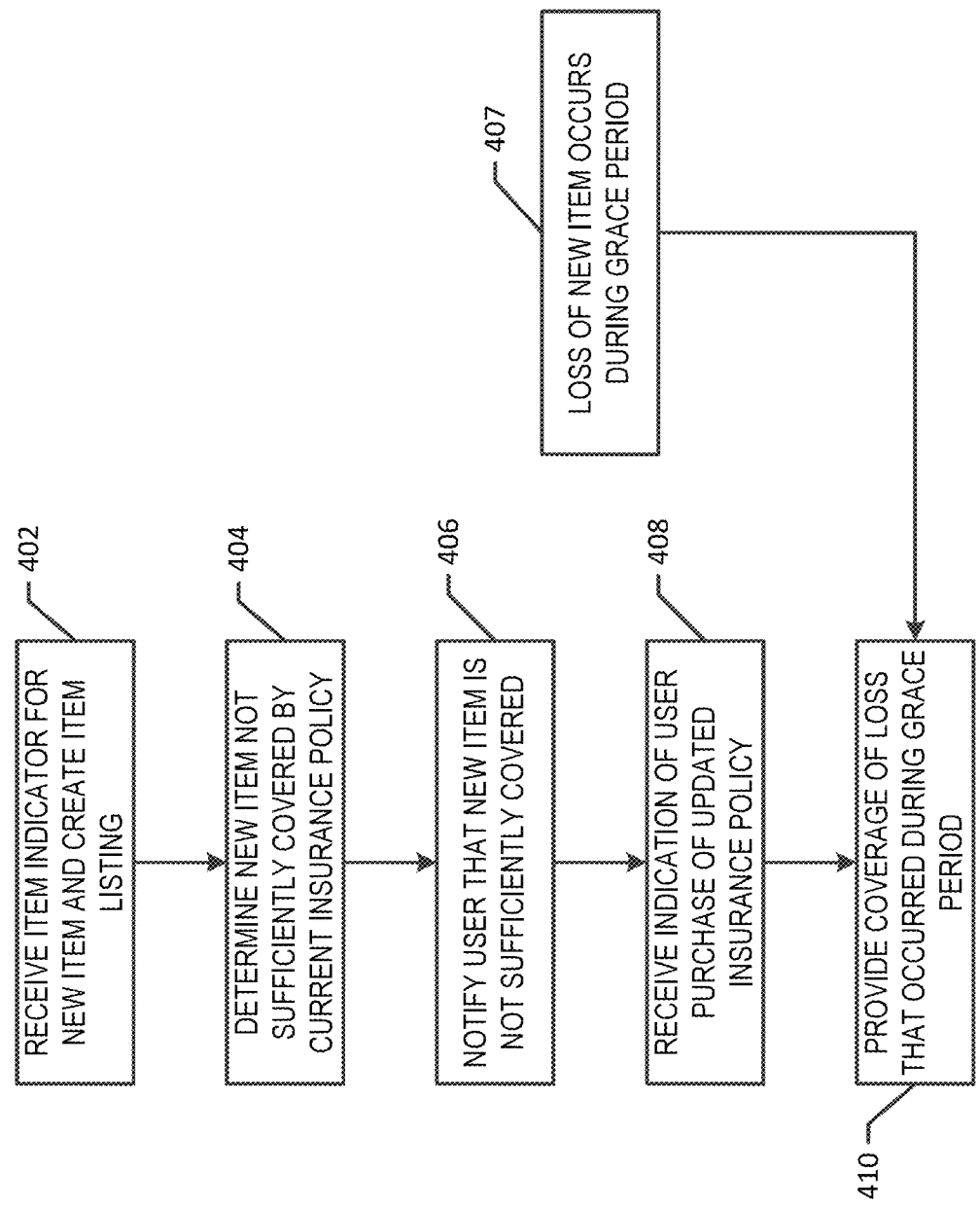

As noted above, in various scenarios, a user may purchase an item that is not covered or insufficiently covered by the user's current insurance policy. In various embodiments, of the present invention, the user may be notified of the lack of coverage offered by the user's existing insurance policy. FIG. 5 provides a flowchart illustrating processes and operations that may be completed in various embodiments regarding interim insurance coverage while the user is provided time to respond to the notification and accept or decline a quoted insurance policy, inquire regarding modification of a quoted insurance policy, and/or the like. For example, the user may be given a predetermined time period (e.g., five business days, one week, two weeks, one month, and/or the like) after the sending of a notification to respond to the notification accepting, declining, or modifying a quoted insurance policy. For example, the user may be provided interim coverage during the predetermined time period or until the user accepts or declines an updated insurance policy, whichever comes first. In another example, the user that recently bought the $300 necklace may be quoted an insurance policy that provides a $1,500 coverage limit for jewelry. However, the user is planning to buy additional jewelry in the near future and therefore responds to the notification by requesting a quote for an insurance policy that provides a $2,000 coverage limit for jewelry. In one embodiment, the user may be provided interim coverage of the necklace for a predetermined time period after the quote for the modified insurance policy is provided to the user.

Starting at step 402, an item indicator is received and an item listing is created for an item recently purchased by a user. For example, the user (perhaps via the user computing entity 30, in person, and/or the like) may purchase jewelry, consumer electronics, artwork, furniture, and/or the like. The claims system 100 may receive an item indicator and create an item listing for the new item, as described above. Similar to step 316 described above, at step 404, it may be determined that the new item is not sufficiently covered by the user's current insurance policy. After determining that the user's current insurance policy does not sufficiently cover the new item, as determined based on the conditions and/or terms of the current insurance policy, the user's item inventory, and/or the like, or possibly in response thereto, the user is notified that the user's current insurance policy does not cover or does not sufficiently cover the new item at step 406. For example, the notification may include a bindable or non-bindable quote for an updated insurance policy that would sufficiently cover the new item and/or the items listed in the user's item inventory.

At step 407, a loss occurs associated with the new item and during a predetermined grace period. For example, the predetermined grace period may be 5 business days, one week, two weeks, 30 days, a calendar month, and/or the like from the time the user purchased the new item or from the time the notification is sent at step 406. In various embodiments, the loss may be a loss that would be covered under the updated insurance policy for which a quote was provided in step 406.

At step 408, before the expiration of the predetermined grace period, an indication may be received of purchase of an updated insurance policy by the user that would sufficiently cover the new item. For example, the claims system 100 may receive an indication that the user decided to purchase an updated insurance policy that sufficiently covers the new item before the expiration of the predetermined grace period. At step 410, coverage of the loss related to the new item that occurred during the grace period is provided. For example, the claims system 100 processes an insurance claim associated with the loss related to the new item during the grace period under the terms and conditions of the updated insurance policy. In one embodiment, the interim insurance coverage is provided even if the user does not decide to buy the updated insurance policy.

As described above, a user's item inventory may continue to be updated by the creation of additional item listings or updating of existing item listings. For example, a user may log on to a web-page, portal, application, and/or the like associated with claims system 100, select an item from the user's item inventory, and provide updates related to the item. For example, if a user no longer owns an item, the user may update the item listing to indicate that the user no longer owns the item. If the user recently had her grandmother's pearls appraised, she can select the item listing corresponding to her grandmother's pearls and provide information regarding the recent appraisal. It should be understood that a user may update a variety of item listings with various information, as appropriate for the application. If the user experiences a loss of one or more items (e.g., an item is lost, stolen, damaged, and/or the like), the user may utilize the item inventory to aid in the replacement of the one or more items and/or the filing of an insurance claim pertaining to the one or more items, as described in detail below.

3. Processing an Insurance Claim

Figure 6:
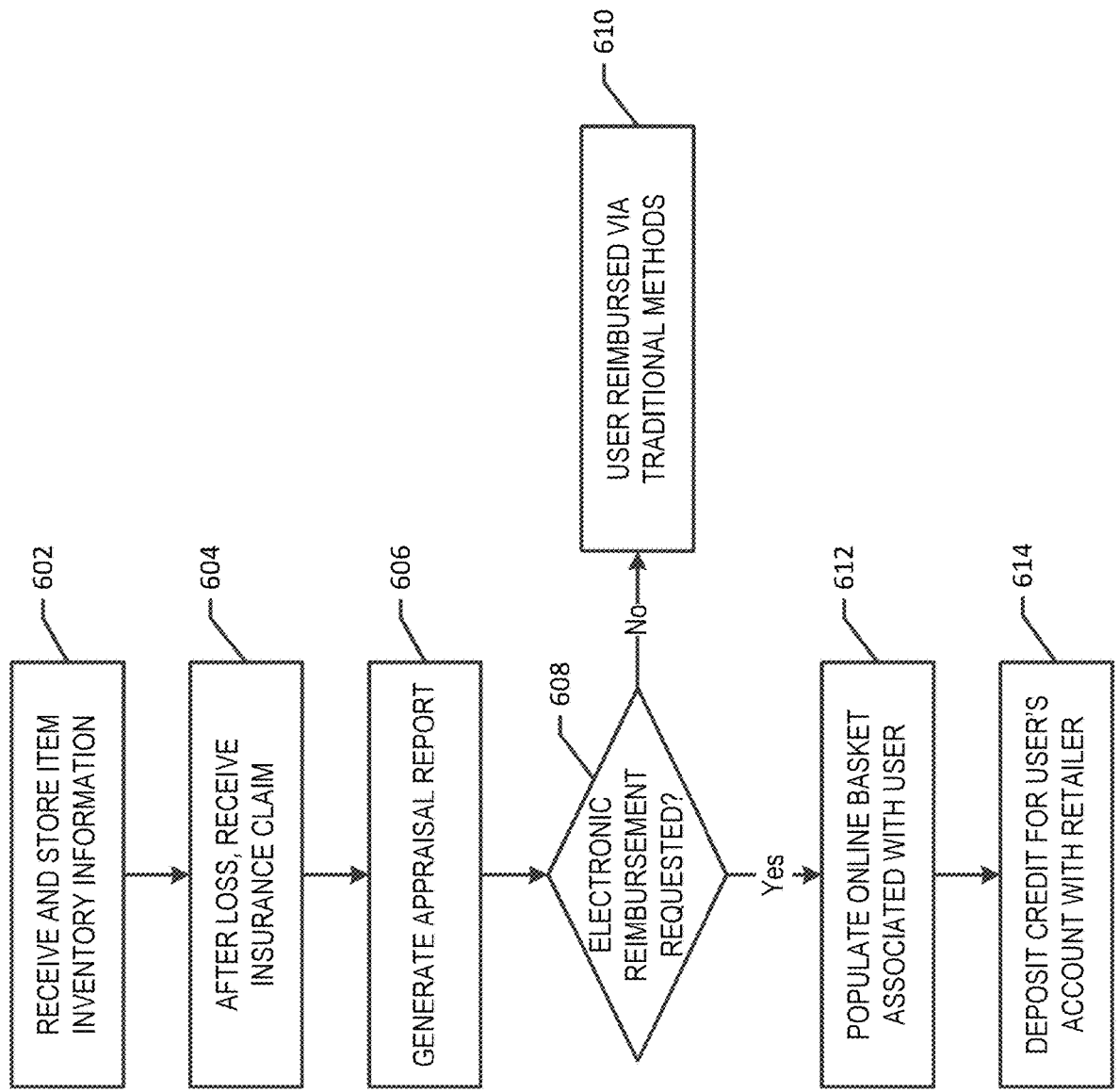

As indicated above, one possible context for a report of loss is an insurance claim. FIG. 6 provides a flowchart of processes and operations that may be completed according to various embodiments for replacing an item when the report of loss is an insurance claim. Starting at step 602, an item inventory is created via the creation of one or more item listings. For example, an item inventory comprising one or more item listings may be created and stored. For example, the claims system 100 may create and store one or more item listings, each item listing corresponding to an item owned by and/or in the possession of a user or a family, group, organization, company, department of a company, and/or the like that the user is associated with. In various embodiments, the item inventory and corresponding item listings may be created and/or maintained as described above or via some other appropriate method. In various embodiments, the user or the family, group, organization, company, department of a company and/or the like associated with the item inventory may be an entity having an insurance policy covering at least some of the items corresponding to the item listings in the item inventory.

At step 604, after a loss occurs, an insurance claim is received. For example, after the user or the family, group, organization, company, department of a company and/or the like associated with the item inventory experiences a loss, the claims system 100 may receive an insurance claim identifying one or more items. For example, after a user experiences a loss (e.g., fire, theft, and/or the like), the user may access the stored item inventory (e.g., via the user computing entity 30) to generate and submit an insurance claim. For example, the user may select (e.g., via the user computing entity 30) the one or more items on the item inventory that were damaged, broken, stolen, and/or otherwise affected. For example, the insurance claim may identify an item listing corresponding to at least one of the items or for each item identified in the insurance claim and/or the insurance claim may comprise one or more item indicators corresponding to item listings associated with the user's item inventory. For example, a user (e.g., operating a user computing entity 30) may access a user interface 900 associated with the item inventory and select one or more item listings as part of creating the report of loss, as shown in FIG. 7.

FIG. 7 provides an example claim submission user interface 900. For example, the user may be asked to provide information regarding the type of loss 905 and describe the incident in which the loss occurred 910. For example, if the type of loss was theft, the user may describe that the loss occurred when the user's car was broken into between 4 μm and 5 pm on Friday Mar. 13, 2015 in the Kroger parking lot on Ponce de Leon Ave. The user may be provided (e.g., via the user computing entity 30) with a mechanism to select items 915 associated with the claim from the item inventory. For example, the images, item names, user provided names, and/or the like may be provided (e.g., via the user computing entity 30) for a user to select items associated with the claim.

The user may also be provided an opportunity 920 to provide (e.g., via the user computing entity 30) one or more item indicators for items not yet in the item inventory that are associated with the insurance claim.

In various embodiments, the user may create or update an item inventory in the process of submitting a claim. For example, the user (e.g., operating a user computing entity 30) may submit a claim comprising one or more item indicators. For example, if the user already has an item inventory, an item recently purchased may not have been added to the item inventory yet. An item indicator may be provided as part of the submitted item inventory in order to create an item listing corresponding to the item. In another example, a user may not have an item inventory and may provide item indicators as part of the insurance claim in order to create an item inventory.

Returning to FIG. 6, at step 606, an appraisal report is generated. For example, the claims system 100 may automatically generate an appraisal report based at least in part on the insurance claim; item listings associated with at least one item identified in the insurance claim; the insurance policy associated with the item inventory, user, and/or the like; external information/data accessed via one or more of the external information/data source systems 300; and/or the like. In various embodiments, the appraisal report may be generated similar to the process described above comprising identifying the item listing corresponding to at least one or all of the items identified in the insurance claim, identifying a replacement item for at least one or all of the items identified in the insurance claim, calculating/determining a replacement value for at least one or all of the items identified in the insurance claim, and/or the like. As should be understood, a variety of other methods may be used to generate an appraisal report based at least in part on the item inventory as appropriate for the application.

For example, the claims system 100 may automatically determine a market value, cost of replacement, actual cash value, and/or the like for the one or more items indicated by the submitted claim to have been damaged, broken, stolen, or otherwise affected. For example, the claims system 100 may determine market values, cost of replacement, and/or the like via retail inventories associated with one or more retailer/market systems 200. For example, a user's couch may have been damaged in a fire. The claims system 100 may determine that the same sofa is available for purchase via a retailer associated with a retailer/market system 200. The replacement value for the sofa may be based on the retail cost of the sofa from the retailer. However, if the same sofa is not available and/or if a similar sofa is available for purchase from a retailer associated with a retailer/market system 200, the replacement value for the sofa may be based on the price of the similar sofa. The replacement value of the item may be determined based on the market value, cost of replacement, and/or insurance policy information associated with the items indicated by the submitted claim as damaged, broken, stolen, and/or otherwise affected.

At step 608, it may be determined if the user requested to receive electronic reimbursement. For example, the claims system 100 may determine if the user requested (e.g., via the item inventory, a user profile associated with the user, or the submitted claim) to receive electronic reimbursement using a variety of technologies and services (e.g, PayPal™, Google Wallet, Amazon Payments, virtual currencies (e.g., Bitcoins), retailer accounts, credit card accounts, bank accounts, award or reward points, Erply, Leaf, Apple Pay, Leapset, Micros, Revel, ShopKeep, TouchBistro, Vend, and/or the like). If it is determined that the user did not request to receive electronic reimbursement, at step 610, the user is reimbursed through traditional reimbursement mechanisms (e.g., check, pre-paid debit card, and/or the like).

If it is determined at step 608 that the user did request electronic reimbursement, the process continues to step 612. At step 612, an online shopping cart, wish list, replacement item list, and/or the like (referred to herein as an "electronic list") associated with the user is automatically populated with at least one replacement item corresponding to an item identified via the insurance claim. In some embodiments, the online shopping cart associated with the user is automatically populated with a replacement item corresponding to each item identified via the insurance claim. For example, the claims system 100 may automatically populate an online shopping cart associated with the user with replacement items corresponding to at least one or all of the items identified by the insurance claim. For example, the claims system 100 may communicate with one or more retailer/market systems 200 (e.g., amazon.com, ebay.com, target-.com) to automatically populate an online shopping cart with one or more replacement items. In various embodiments, the online shopping cart is associated with an online retailer. In another embodiment, the online shopping cart is not associated with a particular retailer. For example, the online shopping cart may be provided by the insurance company processing the claim and the replacement items in the online shopping cart may be items from a variety of retailers. For example, the online shopping cart may be provided by the insurance company and may include two items from Sears, an item from Belk, and three items from Target. Thus, the online shopping cart may be configured to provide a simple online shopping cart that leverages items available from a number of retailers and displayed to the user (e.g., via the user computing entity 30) via a single, unified user interface.

At step 614, an account associated with the user and/or the online shopping cart may be credited with a credit value (e.g, PayPal™, Google Wallet, Amazon Payments, virtual currencies (e.g., Bitcoins), credit card accounts, retailer accounts, bank accounts, award or reward points, Erply, Leaf, Apple Pay, Leapset, Micros, Revel, ShopKeep, TouchBistro, Vend, and/or the like). For example, the claims system 100 may facilitate a credit value being credited to an account associated with the user and/or the online shopping cart. In various embodiments, the credit value is equal to or greater than the replacement value of at least one item identified in the insurance claim. In some embodiments, the credit value is equal to or greater than the sum of the replacement values of a subset or all of the items identified in the insurance claim. For example, the user's account may be credited with an amount equal to or above the amount the user would have received if the user had chosen to receive a traditional reimbursement. In various embodiments, the user may be provided with a gift card having stored thereon or associated therewith a value equal to the credit value. The gift card may be associated with a particular retailer or may be a general gift card that may be used at a variety of retailers. In some embodiments, the credit value may be directly credited to a user account with an online retailer associated with the online shopping cart. It should be understood that a variety of methods may be used to credit an account associated with the user and/or the populated online shopping cart with the credit value.

In various embodiments, the online shopping cart is associated with a user account with a retailer or other entity (e.g., the insurance company). The user (e.g., operating a user computing entity 30) may log into the user's account associated with the retailer or other entity. The user may edit the online shopping cart, complete a transaction associated with the online shopping cart, and/or the like. As should be understood, various embodiments may include some but not all or portions of the steps described herein.

In various embodiments, processing insurance claims in this manner may provide a more consistent claims fulfillment experience for users and help to process and fulfill claims more quickly.

4. Replacing an Item

Figure 8:
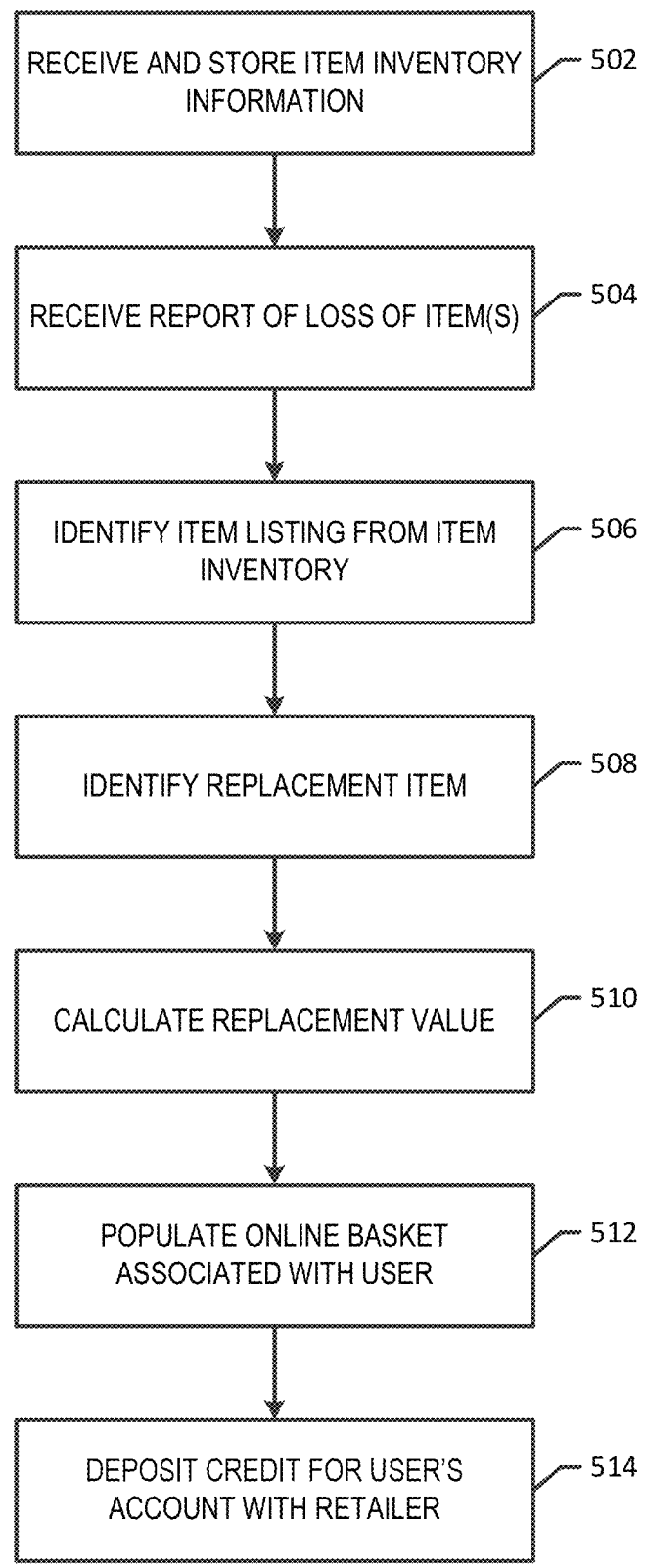

FIG. 8 provides a flowchart illustrating processes and operations that may be completed for replacing one or more items, according to various embodiments. For example, the one or more items may be replaced as a result of or as a part of processing of an insurance claim. Starting at step 502, one or more item listings are created. For example, an item inventory comprising one or more item listings may be created and stored. For example, the claims system 100 may create and store one or more item listings, each item listing corresponding to an item owned by and/or in the possession of a user or a family, group, organization, company, department of a company, and/or the like with which the user is associated. In various embodiments, the item inventory and corresponding item listings may be created and/or maintained as described above or via some other appropriate method.

At step 504, a report of a loss of one or more items is received. For example, the claims system 100 may receive a report of a loss of one or more items. The report of loss of one or more items may comprise information identifying each of the one or more items. For example, the report of loss of one or more items may identify an item listing corresponding to at least one of the items or for each item. For example, the report of loss may comprise one or more item indicators corresponding to item listings in the item inventory and/or for items not previously entered into the item inventory. In another example, a user (e.g., operating a user computing entity 30) may access a user interface (e.g., similar to user interface 900 described above) associated with the item inventory and select one or more item listings as part of creating the report of loss. In one embodiment, the report of loss of one or more items may be an insurance claim.

At step 506, an item listing is identified for at least one of the items identified in the report of loss. For example, the claims system 100 may identify an item listing for at least one of the items listed in the report of loss. In some embodiments, an inventory listing may be identified for each item identified in the report of loss. For example, the claims system 100 may identify an item listing corresponding to each of the items identified in the report of loss. An item listing may be identified based on the information identifying each of the items or the selected item listings comprising the report of loss.

At step 508, a replacement item is identified. For example, the claims system 100 may identify a replacement item corresponding to at least one of the items identified in the report of loss. In another example, the claims system 100 may identify a replacement item corresponding to each item identified in the report of loss. In some embodiments, a replacement item may be an item having the same or similar appearance, functionality, and/or the like. For example, the replacement item corresponding to a blue couch may be another blue couch, a brown couch, a green couch, and/or the like. In another example, a replacement item corresponding to an iPad may be another iPad or other tablet of similar quality and/or functionality. In various embodiments, the replacement item is identified based at least in part on at least one of an item value, item dimensions, manufacturer, special handling instructions, item quality, item name, item description, item keyword, UPC code, replacement item indicator, digital image of the item or other item information that may be stored in the item listing or that may be accessed via one or more of the external information/data source systems 300. In one embodiment, the item information stored in association with the item listing comprises a hypertext link or other link to an online/electronic catalog listing for the replacement item or my otherwise identify a replacement item. The online/electronic catalog may be associated with a particular online retailer.

At step 510, a replacement value for at least one of the items is calculated/determined. For example, the claims system 100 may calculate/determine a replacement value for at least one of or each of the items identified in the report of loss. In various embodiments, the replacement value may be calculated/determined based on item information/data stored in association with the item listing corresponding to the item (e.g., how long the user has had the item, the condition of the item, date/year of manufacture of the item, current value of the item, purchase cost of the item, depreciation schedule/ table, and/or the like), based on the cost of the replacement item, based on the cost of the replacement item at one or more retailers, and/or the like. For example, the claims system 100 may access information/data associated with a replacement item cost via one or more retailer/market systems 200 and/or one or more external information/data source systems 300.

At step 512, an online shopping cart, wish list, replacement item list, and/or the like (referred to herein as an "electronic list") associated with the user may be populated with at least one replacement item corresponding to an item identified in the report of loss. For example, the claims system 100 may automatically populate an online basket associated with the user with a replacement item corresponding to at least one item identified in the report of loss or a replacement item for each item identified in the report of loss. In various embodiments, the online basket may be identified with an online retailer and provided by retailer/ market system 200. In another embodiment, the online shopping cart is not associated with a particular retailer. For example, the online basket may be provided by the claims system 100 and the replacement items in the online basket may be items from a variety of retailers. For example, the online basket may be provided by the insurance company and may include two items from Sears, an item from Belk, and three items from Target. Thus, the online shopping basket may be configured to provide a simple online basket that leverages items available from a number of retailers and displayed to the user (e.g., via the user computing entity 30) via a single, unified user interface.

Figure 9:
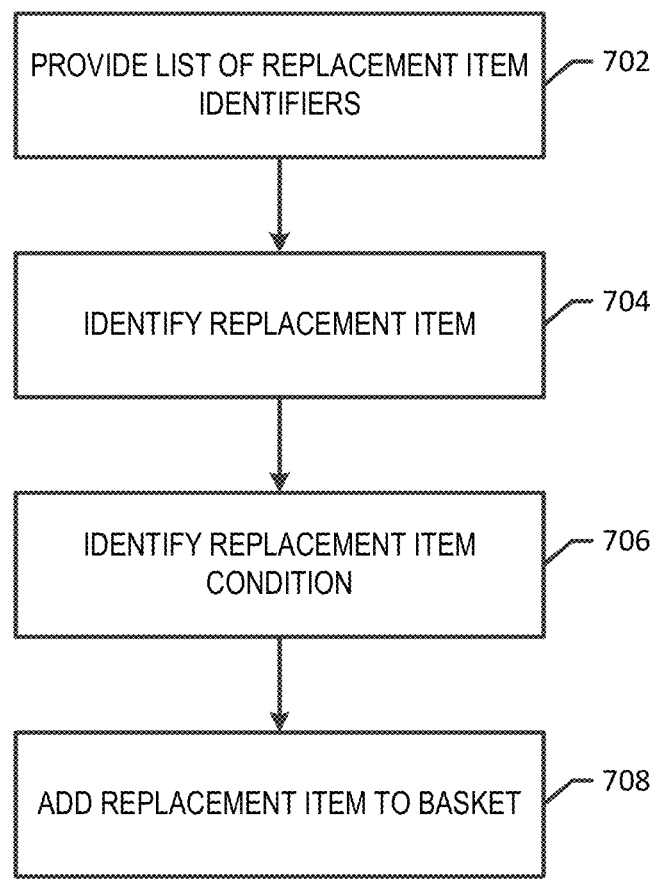

FIG. 9 shows an example method of automatically populating an electronic list according to some embodiments of the present invention. At step 702, a list or set of replacement item indicators are provided. For example, the claims system 100 may provide a list or set of replacement item indicators to one or more retailer/market systems 200. In various embodiments, the replacement item indicators may be identified based on the item listings corresponding to the items identified in the report of loss. In various embodiments, a replacement item indicator may be a UPC, SKU, item description, item name, catalog number, the item indicator provided in the creation of the item listing for the item, and/or other replacement item indicator.

At step 704, the replacement item catalog listing may be identified. For example, the retailer/market system 200 may identify at least one replacement item catalog listing for at least one and/or each replacement item indicator provided. For example, if a UPC is provided as the replacement item indicator, the catalog listing associated with the provided UPC is identified. At step 706, the replacement item condition may be identified. For example, based on the replacement item indicator and/or other information provided by the claims system 100, the retailer/market system 200 may identify a replacement item having the appropriate condition. For example, in various embodiments, the user may have an insurance policy that provides for new replacement items regardless of the condition of the lost item (e.g., the item that was stolen, broken, damaged, etc.). In another example, a user may have an insurance policy that provides for replacement items of similar condition as the lost item. For example, if the lost item was in good but used condition, the insurance policy may cover a replacement item also in good but used condition. A user may be able to specify, in the report of loss, a user profile, in an item listing, and/or the like, that if an item needs to be replaced, the user would like the item to be replaced with a replacement item in new condition and the user will pay the difference between what the insurance coverage provides for the replacement item and the cost of the new replacement item. For example, if the insurance policy covers replacing the item with a replacement item of the same condition, the user may indicate that they would like a new replacement item and will pay the difference between the replacement value and the cost of the new replacement item. For example, the user has a three year old, lightly used couch that is damaged in a fire. The user's insurance policy may cover the replacement value of a lightly used couch, but not a new couch. The user may indicate that they would like to replace the couch with a new couch and will pay the difference between the replacement value of the lightly used couch and the cost of the new couch.

At step 708, a replacement item is selected based on the replacement item catalog listing and replacement item condition and add the selected replacement item to the electronic list associated with the user. For example, the retailer/market system 200 may select a replacement item based on the replacement item catalog listing and the replacement item condition, and add the selected replacement item to the electronic list associated with the user. For example, the user may have an account with the retailer operating the retailer/market system 200 or the retailer/market system 200 may create an account for the user and provide the user (e.g., via the user computing entity 30) the log in information for the account. Steps 702 through 708 may be repeated for each replacement item corresponding to the list and/or set of replacement item indicators.

Returning to FIG. 8, at step 514, an account associated with the user and/or the online shopping cart may be credited with a credit value. For example, the claims system 100 may facilitate a credit value being credited to an account associated with the user and/or the electronic list. In various embodiments, the credit value is equal to or greater than the replacement value of at least one item identified in the report of loss. In some embodiments, the credit value is equal to or greater than the sum of the replacement value of a subset or all of the items identified in the report of loss. In various embodiments, the user may be provided with a gift card having stored thereon or associated therewith a value equal to the credit value. The gift card may be associated with a particular retailer or may be a general gift card that may be used at a variety of retailers. In some embodiments, the credit value may be directly credited to a user account with the online retailer associated with the electronic list. In another embodiment, a PayPal account associated with the user or an account with a similar service and associated with the user may be credited the credit value. For example, the claims system 100 may link to the retailer/market system 200 or other system (e.g., PayPal system and/or the like) and/or log into the user's account with the retailer, PayPal, and/or the like, to credit the user's account. For example, the user's account information may be stored in association with a user profile linked to and/or associated with the user's item inventory. In some embodiments, as described above, a user account with the retailer may be created for the replacement transaction and the account information provided to the user. It should be understood that a variety of methods may be used to credit an account associated with the user and/or the populated electronic list with the credit value.

In various embodiments, the electronic list is associated with a user account with a retailer or other entity. The user (e.g., operating a user computing entity 30) may log into the user's account associated with the retailer or other entity. The user may edit the electronic list, complete a transaction associated with the online basket, and/or the like. As should be understood, various embodiments may include some but not all or portions of the steps described herein.

V. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:
1. A computer-implemented method for automated generation and population of an item listing of an item inventory, the method comprising:
  receiving, by a server system via a network interface, one or more item indicators configured to identify an item owned by a user, wherein the one or more item indicators are provided by a user application operating on a user computing entity in communication with the server system and the user application is configured to interface with a graphical user interface of the user computing entity to identify purchase of the item by the user via the graphical user interface and to provide the one or more item indicators responsive to identifying the purchase of the item by the user;
  responsive to receiving the one or more item indicators, for at least one of the one or more item indicators, analyzing the at least one of the one or more item indicators, by the server system, to automatically identify the corresponding item;
  automatically requesting and receiving, by the server system, data associated with the item from an external computing entity via an application program interface in communication with a data management application operating on the external computing entity;
  automatically determining, by the server system and based at least in part on the data associated with the item, a category associated with the item and identifying an item listing template corresponding to the category;

automatically generating, by the server system, the item listing corresponding to the item based at least in part on the item listing template corresponding to the category associated with the item;

automatically populating, by the server system, one or more fields of the item listing with the data associated with the item, the one or more fields defined at least in part by the item listing template;

automatically determining, by the server system and based at least in part on a user profile associated with the item listing and stored by the server system, one or more online catalogs;

automatically identifying, by the server system, an online catalog listing corresponding to a replacement item corresponding to the item from at least one of the one or more online catalogs, wherein the at least one of the one or more online catalogs is accessible via an application program interface in communication with a catalog application operating on a retailer system, and associating the catalog listing with the item listing; and storing, by the server system, the item listing in the item inventory associated with the user.

2. The method of claim 1, wherein the application is a browser plug in corresponding to a browser operating on the user computing entity and the application is configured to modify a webpage viewed through the browser to provide the user with a selectable icon configured to, when a user provides input selecting the selectable icon, automatically provide a corresponding item indicator such that the server system receives the corresponding item indicator.

3. The method of claim 1, further comprising:
responsive to receiving a request for a replacement of the item via the network interface:
accessing, by a processor of the server system, the item listing from the item inventory,
identifying, by the processor, a replacement item based at least in part on replacement item data stored in a corresponding field of the item listing; and
causing, by the processor and via the network interface, a retailer system to automatically populate an electronic shopping cart with the replacement item,
wherein the request for a replacement of the item is generated responsive to user interaction with an interactive user interface provided by the application via a user interface of the user computing entity, the user interaction comprising selecting a selectable item icon displayed via the graphical user interface and corresponding to the item.

4. The method of claim 1, wherein the one or more fields are selected from the group consisting of an item value, item dimensions, an item manufacturer, an item quality, an item name, and an item description.

5. The method of claim 1, further comprising:
identifying an insurance policy for the user; and
determining if at least one of the items of the item listing is covered under the insurance policy.

6. The method of claim 5, further comprising, in response to determining that a particular item of the item listing is not covered under the insurance policy, providing a notification to the user that the particular item is not covered under the insurance policy.

7. The method of claim 6, wherein the notification comprises a quote for an insurance policy that does cover the particular item, the quote being valid for a predetermined time period, the method further comprising:
receiving a response during the predetermined time period indicating the user wishes to purchase the quoted insurance policy; and
responsive to receiving the response during the predetermined time period, providing the user with interim coverage in accordance with the quoted insurance policy.

8. The method of claim 1, further comprising:
receiving an insurance claim identifying a particular item of the item listing; and
processing the insurance claim based at least in part on the data stored in the one or more fields for the particular item.

9. A system comprising at least one first memory device, at least one first processor, and a first network interface configured to communicate via at least one network, the system configured to at least:
receive, via the at least one network interface, one or more item indicators configured to identify an item owned by a user, wherein the one or more item indicators are provided by a user application operating on a user computing entity in communication with the system and the user application is configured to interface with a graphical user interface of the user computing entity to identify purchase of the item by the user via the graphical user interface and to provide the one or more item indicators responsive to identifying the purchase of the item by the user;

responsive to receiving the one or more item indicators, for at least one of the one or more item indicators, analyzing the at least one of the one or more item indicators to automatically identify the corresponding item;

automatically requesting and receiving data associated with the item from an external computing entity via an application program interface in communication with a data management application operating on the external computing entity;

automatically determining, based at least in part on the data associated with the item, a category associated with the item and identifying an item listing template corresponding to the category;

automatically generating the item listing corresponding to the item based at least in part on the item listing template corresponding to the category associated with the item;

automatically populating one or more fields of the item listing with the data associated with the item, the one or more fields defined at least in part by the item listing template;

automatically determining, based at least in part on a user profile associated with the item listing and stored by the system, one or more online catalogs;

automatically identifying an online catalog listing corresponding to a replacement item corresponding to the item from at least one of the one or more online catalogs, wherein the at least one of the one or more online catalogs is accessible via an application program interface in communication with a catalog application operating on a retailer system, and associating the catalog listing with the item listing; and storing the item listing in the item inventory associated with the user.

10. The system of claim 9, wherein the application is a browser plug in corresponding to a browser operating on the user computing entity and the application is configured to modify a webpage viewed through the browser to provide the user with a selectable icon configured to, when a user provides input selecting the selectable icon, automatically provide a corresponding item indicator such that the server system receives the corresponding item indicator.

11. The system of claim 9, wherein the system is further configured to at least:
responsive to receiving a request for a replacement of the item via the network interface:
access the item listing from the item inventory,
identify a replacement item based at least in part on replacement item data stored in a corresponding field of the item listing; and
cause, via the network interface, a retailer system to automatically populate an electronic shopping cart with the replacement item,
wherein the request for a replacement of the item is generated responsive to user interaction with an interactive user interface provided by the application via a user interface of the user computing entity, the user interaction comprising selecting a selectable item icon displayed via the graphical user interface and corresponding to the item.

12. The system of claim 9, wherein the one or more fields are selected from the group consisting of an item value, item dimensions, an item manufacturer, an item quality, an item name, and an item description.

13. The system of claim 9, wherein the system is further configured to at least:
identify an insurance policy for the user; and
determine if at least one of the items of the item listing is covered under the insurance policy.

14. The system of claim 13, wherein the system is further configured to at least, in response to determining that a particular item of the item listing is not covered under the insurance policy, providing a notification to the user that the particular item is not covered under the insurance policy.

15. The system of claim 14, wherein the notification comprises a quote for an insurance policy that does cover the particular item, the quote being valid for a predetermined time period, the system further configured to at least:
receive a response during the predetermined time period indicating the user wishes to purchase the quoted insurance policy; and
responsive to receiving the response during the predetermined time period, providing the user with interim coverage in accordance with the quoted insurance policy.

16. The system of claim 9, wherein the system is further configured to at least:
receive an insurance claim identifying a particular item of the item listing; and
process the insurance claim based at least in part on the data stored in the one or more fields for the particular item.

17. A computer program product comprising at least one non-transitory computer-readable storage medium having computer-readable program code portions stored therein, the computer-readable program code portions comprising executable portions configured to, when executed by a processor of a system computing entity, cause the system computing entity to:
receive one or more item indicators configured to identify an item owned by a user, wherein the one or more item indicators are provided by a user application operating on a user computing entity in communication with the system computing entity and the user application is configured to interface with a graphical user interface of the user computing entity to identify purchase of the item by the user via the graphical user interface and to provide the one or more item indicators responsive to identifying the purchase of the item by the user;
responsive to receiving the one or more item indicators, for at least one of the one or more item indicators, analyzing the at least one of the one or more item indicators to automatically identify the corresponding item;
automatically requesting and receiving data associated with the item from an external computing entity via an application program interface in communication with a data management application operating on the external computing entity;
automatically determining, based at least in part on the data associated with the item, a category associated with the item and identifying an item listing template corresponding to the category;
automatically generating the item listing corresponding to the item based at least in part on the item listing template corresponding to the category associated with the item;
automatically populating one or more fields of the item listing with the data associated with the item, the one or more fields defined at least in part by the item listing template;
automatically determining, based at least in part on a user profile associated with the item listing and stored by the system computing entity, one or more online catalogs;
automatically identifying an online catalog listing corresponding to a replacement item corresponding to the item from at least one of the one or more online catalogs, wherein the at least one of the one or more online catalogs is accessible via an application program interface in communication with a catalog application operating on a retailer system, and associating the catalog listing with the item listing; and
storing the item listing in the item inventory associated with the user.

18. The computer program product of claim 17, wherein the application is a browser plug in corresponding to a browser operating on the user computing entity and the application is configured to modify a webpage viewed through the browser to provide the user with a selectable icon configured to, when a user provides input selecting the selectable icon, automatically provide a corresponding item indicator such that the server system receives the corresponding item indicator.

19. The computer program product of claim 17, wherein the executable portions are further configured to:
responsive to receiving a request for a replacement of the item via the network interface:
access the item listing from the item inventory,
identify a replacement item based at least in part on replacement item data stored in a corresponding field of the item listing; and
cause, via the network interface, a retailer system to automatically populate an electronic shopping cart with the replacement item,
wherein the request for a replacement of the item is generated responsive to user interaction with an interactive user interface provided by the application via a user interface of the user computing entity, the user interaction comprising selecting a selectable item icon displayed via the graphical user interface and corresponding to the item.

20. The computer program product of claim 17, wherein the executable portions are further configured to:
- receive an insurance claim identifying a particular item of the item listing; and
- process the insurance claim based at least in part on the data stored in the one or more fields for the particular item.

* * * * *